(12) United States Patent
Gopalakrishnan et al.

(10) Patent No.: US 7,391,755 B2
(45) Date of Patent: Jun. 24, 2008

(54) SIGNALING AND CONTROL MECHANISMS IN MIMO HARQ SCHEMES FOR WIRELESS COMMUNICATION SYSTEMS

(75) Inventors: Nandu Gopalakrishnan, Chatham, NJ (US); Jung-Tao Liu, Randolph, NJ (US); Ashok N. Rudrapatna, Basking Ridge, NJ (US); Naresh Sharma, Budd Lake, NJ (US); Achilles George Kogiantis, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1021 days.

(21) Appl. No.: 10/261,283

(22) Filed: Sep. 30, 2002

(65) Prior Publication Data

US 2004/0062221 A1  Apr. 1, 2004

(51) Int. Cl.
*H04Q 7/00* (2006.01)
*H04Q 7/28* (2006.01)

(52) U.S. Cl. .................. 370/334; 370/341; 370/346
(58) Field of Classification Search .......... None
See application file for complete search history.

(56) References Cited

U.S. PATENT DOCUMENTS

| | | | |
|---|---|---|---|
| 6,127,971 A | 10/2000 | Calderbank et al. | |
| 6,360,080 B1 * | 3/2002 | Yun et al. | 455/70 |
| 6,463,279 B1 * | 10/2002 | Sherman et al. | 455/427 |
| 6,920,152 B1 * | 7/2005 | Chang et al. | 370/474 |
| 7,031,419 B2 * | 4/2006 | Piirainen | 375/358 |
| 7,167,461 B2 * | 1/2007 | Odenwalder et al. | 370/335 |
| 2001/0002904 A1 | 6/2001 | Proctor, Jr. | |
| 2003/0174642 A1 * | 9/2003 | Yang et al. | 370/209 |
| 2003/0210668 A1 * | 11/2003 | Malladi et al. | 370/335 |
| 2004/0203456 A1 * | 10/2004 | Onggosanusi et al. | 455/67.13 |

FOREIGN PATENT DOCUMENTS

EP  1 207 635 A  5/2002

\* cited by examiner

*Primary Examiner*—Chi Pham
*Assistant Examiner*—Soon D. Hyun

(57) ABSTRACT

A method for conveying signaling information of a communication system that uses MIMO antenna systems. To enable a relatively larger amount of information to be conveyed over the communication system and thus exploit the use of the MIMO antenna system, forward link signaling channels are provided where such channels contain swapping information that allow the communication system to retransmit traffic information using any one of the antenna elements of a MIMO system. The forward link signaling channels also contain channel assignment information that indicate which particular groups of channels are available for use by particular users of the communication system. To further accommodate for the relatively larger amount of information being conveyed over the communication system, the format of the reverse link signaling information is modified using any one or any combination of the following three mechanisms: (1) reverse signaling link information is time division multiplexed; (2) the reverse link information is modulated at relatively higher order modulation; (3) additional channels are provided for the reverse link information.

11 Claims, 4 Drawing Sheets

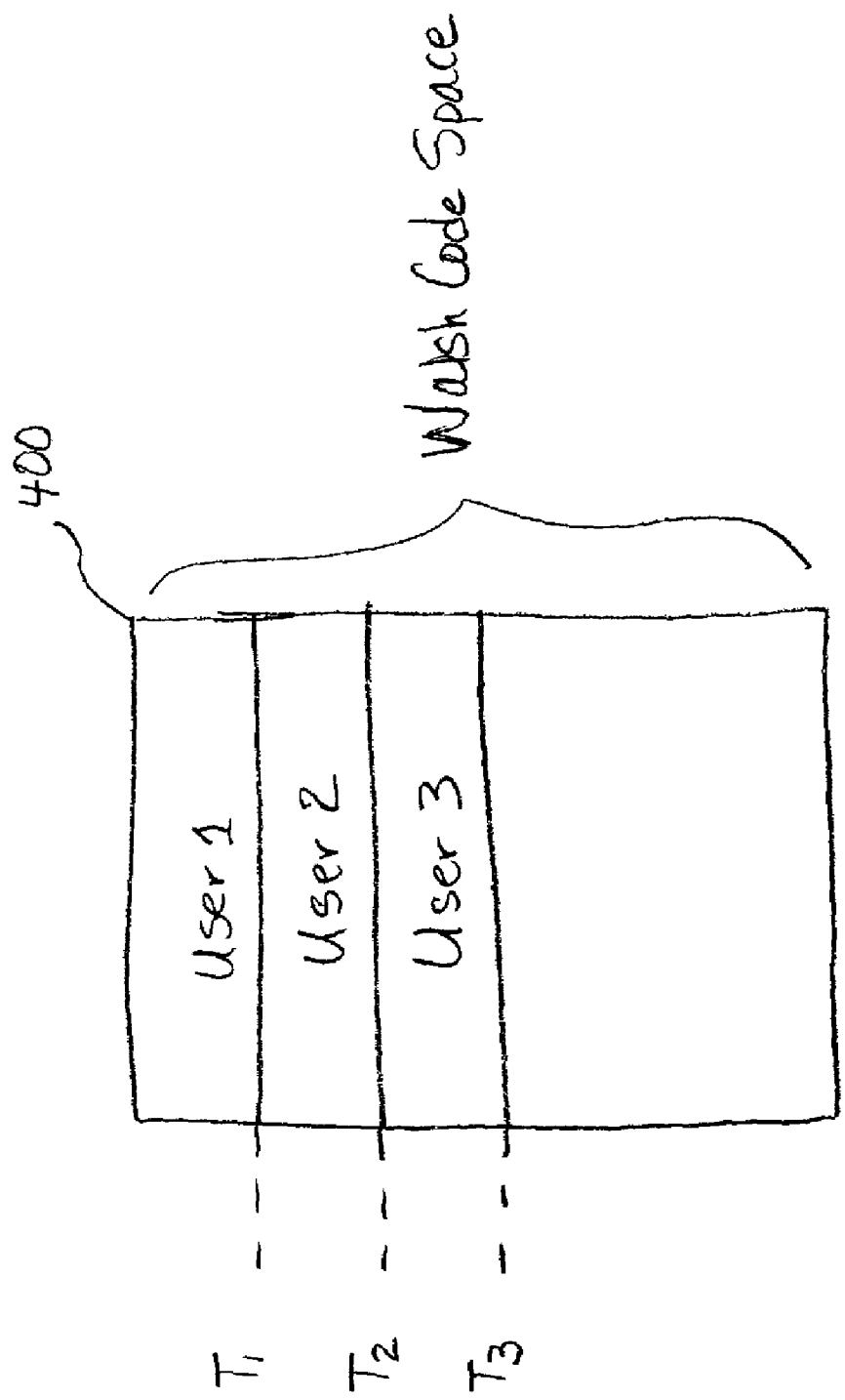

SIGNALING AND CONTROL MECHANISMS IN MIMO HARQ SCHEMES FOR WIRELESS COMMUNICATION SYSTEMS

BACKGROUND OF THE INVENTION

1. Field of the Invention

The present invention relates to wireless communication systems.

2. Description of the Related Art

Communication technology is in a constant state of flux with improvements being made in virtually all aspects of this technology. In particular, wireless communication systems are being designed, built and upgraded to meet ever the increasing demands of their subscribers. One important aspect of wireless communication systems that is currently being upgraded is the capacity—or more importantly, the throughput—of a wireless communication system. Another important and related aspect of the communication system is a system's ability to convey (i.e., transmit and/or receive) information representing not only voice but also data (e.g., graphics, text, digital video). Whether a service provider wants to provide both voice and data or the service provider wants a system with greater capacity, the system throughput has to be improved. It should be well understood that system throughput is the amount of information transmitted and received successfully (without any errors or with an acceptable amount of errors) by system equipment.

The system equipment are the various signal transmitting, signal receiving and signal processing equipment typically used in a wireless communication system. Examples of system equipment include modulators, encoding circuitry, power amplifiers, decoding circuitry, computers, filters and demodulators. A service provider is typically a commercial entity that owns, operates, controls and manages the system equipment. System equipment convey information to other system equipment or to user equipment. Examples of user equipment include cellular phones, pagers, wireless PCs and Personal Digital Assistants (PDAs). The terms "user" and "user equipment" will hereinafter be used interchangeably. In wireless cellular communication systems much of the system equipment is located in base stations that are serving different cells of the communication system. A cell is a geographical area defined by physical boundaries. A base station is formed from one or more locations within a cell and contains system equipment.

One of the critical components of a wireless communication system that directly affects a communication system's capacity and throughput is the antenna equipment used in the system. Antennas transmit and receive communication signals that carry various types of information (e.g., voice, data) throughout the communication channels of the communication system. In order to increase a communication system's capacity and throughput, the number of the antennas themselves has to increase. One technique used for increasing the capacity of antennas is to use a Multiple Input Multiple Output (MIMO) antenna system whereby an array of antenna elements is used to simultaneously transmit and receive communication signals. One example of a MIMO system is the Bell Laboratories Layer Space Time (BLAST) system developed by Bell Labs of Lucent Technologies, headquartered in Murray Hill, N.J. Current antenna systems typically used in wireless communication systems employ a single antenna for a transmitter and a single antenna for a receiver are known as Single Input Single Output (SISO) systems that transmit and/ or receive communication signals as per a protocol that is part of an established standard. A protocol is a set of rules for conveying signaling and traffic information over communication channels of a communication system. The protocol is usually part of a standard that is established by standards bodies, industry groups and/or governmental regulatory bodies. SISO systems use one antenna or a one-antenna system to convey information.

Communication signals conveyed between a system antenna and a user of the communication system are transmitted and/or received over communication channels commonly referred to as traffic channels. Associated with each traffic channel are signaling channels (also referred to as control channels) which are used to control the flow of information through the traffic channels in accordance with a protocol that is part of an established standard with which the communication system complies. The information conveyed over the signaling channels are signaling information which control how communications are initiated, maintained and terminated in the traffic channels. Information (signaling and/ or traffic) transmitted from system equipment (e.g., base station) to user equipment are said to be transmitted over a forward link. Conversely, information transmitted from user equipment to system equipment are said to be transmitted over a reverse link. Thus, forward signaling information are transmitted from base station to user equipment and reverse signaling information are transmitted from user equipment to base stations.

The format of the signaling information transmitted over the forward and reverse links is governed by the standard being followed by the communication system. Generally, the format of information (signaling and/or traffic) is the particular arrangement of the various portions of that information. A block of signaling information conveyed over a signaling channel relates in some manner to a corresponding one or more blocks of traffic information being conveyed over a traffic channel. The block of signaling information dictates how information flowing through the traffic channel is to be conveyed, processed and interpreted. For example, in a Code Division Multiple Access (CDMA) wireless communication system for 1×-EVDV (EVolution for Data and Voice), the forward signaling information is transmitted over a channel called the Secondary Packet Data Control Channel (SPDCCH). The SPDCCH has a certain format whereby various portions of the signaling information represent how traffic information is to be interpreted and processed.

In a particular version of SPDCCH for example, there are three (3) bits of information called the Encoder Packet Size (EPS) which indicates the number of bits contained in a block of traffic information being conveyed over a traffic channel. The SPDCCH also contains 6 bits called the MAC ID (Medium Access Control IDentifier) which is a particular number that identifies the specific user equipment or mobile conveying the traffic information. The SPDCCH further contains a certain number of bits (usually two (2) bits) called the Redundancy Version (RV) bits which indicate the number of times the same block of traffic information has been retransmitted. When traffic information is transmitted from a base station to a mobile, the base station waits to receive a confirmation message from the mobile indicating whether the mobile has received the transmitted information without errors. If the mobile received the information without errors, it transmits an ACKnowledge (ACK) confirmation message. If the mobile received the information with errors or with an unacceptable amount of errors, it transmits back a Negative ACKnowledgement (NACK) message to the base station informing the base station that the information was received with errors. The base station retransmits the traffic information upon reception of a NACK confirmation message.

The NACK and ACK messages are transmitted over a reverse link channel called the Reverse ACKnowledgement Channel (RACKCH). The base station cannot transmit subsequent traffic information until it receives an ACK or a NACK message from the user equipment. While the base station waits for a confirmation message, it can use that idle time to transmit traffic information to the same user equipment or to other user equipment on a separate channel; in this manner, the base station uses what would otherwise be an idle time period to transmit additional traffic information over other communication channels. The various blocks of traffic information transmitted while waiting for a confirmation message have corresponding ACK or NACK messages associated with them. Two (2) HARQ (Hybrid Automatic repeat ReQuest) bits are currently used to describe the number of communication channels used in transmitting traffic information from the base station to a user equipment; that is, the base station can have up to four (4) traffic information transmissions to one or more users when taking advantage of the idle period that occurs while waiting for confirmation messages.

Another reverse link channel used by user equipment to transmit signaling information to a base station is called the Reverse Channel Quality Indicator Channel (RCQICH). The quality of the forward link communication channels over which the traffic information is transmitted from the base station is obtained by the user equipment. Usually the quality of the forward link communication channels is quantified as the Signal to Noise Ratio (SNR). A mobile is provided with the power level of the noise in the channel and measures the power level of the received signal; the mobile calculates the SNR in a well known fashion using the two power levels. The mobile then transmits the calculated SNR quantity to the base station over the RCQICH.

In communication systems that use MIMO antenna systems, there is a need to have signaling channel formats that can accommodate such systems and are also backward compatible to current SISO systems.

SUMMARY OF THE INVENTION

The present invention provides a method of conveying signaling information over forward and reverse links of a communication system having MIMO antenna systems. The signaling information conveyed over the signaling channels are formatted such that they allow relatively larger amounts of signaling information to be conveyed therefore enabling relatively larger amounts of traffic information to be conveyed by the MIMO antenna systems. Using the method of the present invention and MIMO antennas systems, relatively larger amounts of signaling information can be conveyed to provide for the transmission and/or reception of the traffic information. In particular, the format of the forward link signaling channels provides an arrangement where system equipment are able to switch between antenna elements of a MIMO antenna system to improve the throughput of the communication system. To enable the transmission of relatively larger amounts information for the reverse link signaling channels in communication systems that use MIMO antenna systems, the format of the reverse link signaling channels can be modified in any one of three basic ways: (1) reverse link signaling information are time division multiplexed; (2) additional channels are provided for the reverse link signaling information and (3) reverse link information are modulated at relatively higher order modulation. Further, available signaling and traffic communication channels are assigned—using channel assignment information in the forward link—to specific users who convey information using a MIMO antenna system.

BRIEF DESCRIPTION OF THE DRAWINGS

FIG. 4 depicts an illustrative apportionment of code space among three users for a CDMA wireless communication system among three users.

DETAILED DESCRIPTION

The present invention provides a method of conveying signaling information over forward and reverse links of a communication system having MIMO antenna systems. The signaling information conveyed over the signaling channels are formatted such that they allow relatively larger amounts of information to be conveyed by MIMO antenna systems. Using the method of the present invention and MIMO antennas systems, relatively larger amounts of signaling information can be conveyed to provide for the transmission and/or reception of the traffic information. In particular, the format of the forward link signaling channels provides an arrangement where system equipment are able to use antenna elements effectively of a MIMO antenna system to improve the throughput of the communication system. To support in communication systems that use MIMO antenna systems, the format of the reverse link signaling channels can be modified in any one of three basic ways: (1) reverse link signaling information are time division multiplexed; (2) additional channels are provided for the reverse link signaling information and (3) reverse link information are modulated at relatively higher order modulation. Further, exclusive portions of available signaling and traffic communication channels are assigned to different users who convey information using a MIMO antenna system. Channel assignment information is included in the forward link signaling information to assign available channels (traffic and/or signaling) to particular users. One or more channels can be assigned to a particular user. For ease of explanation, the method of the present invention will be described in the context of a CDMA communication system using a 2×2 MIMO antenna system (two transmit antennas, two receive antennas (not shown)) whose forward link signaling channel is the SPDCCH and whose reverse link signaling channels are the RACKCH and the RCQICH.

Figure 1:
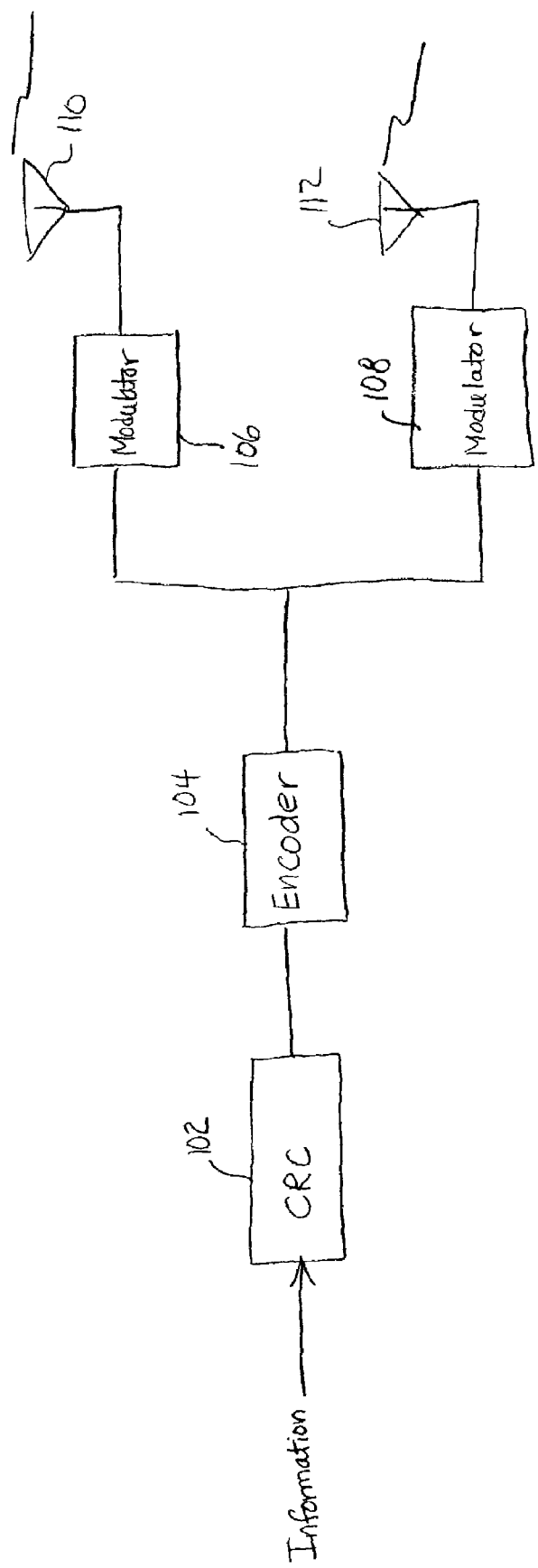
FIG. 1 depicts system transmit equipment architecture using a 2×2 MIMO antenna system to which the method of the present invention is applied.
Figure 2:
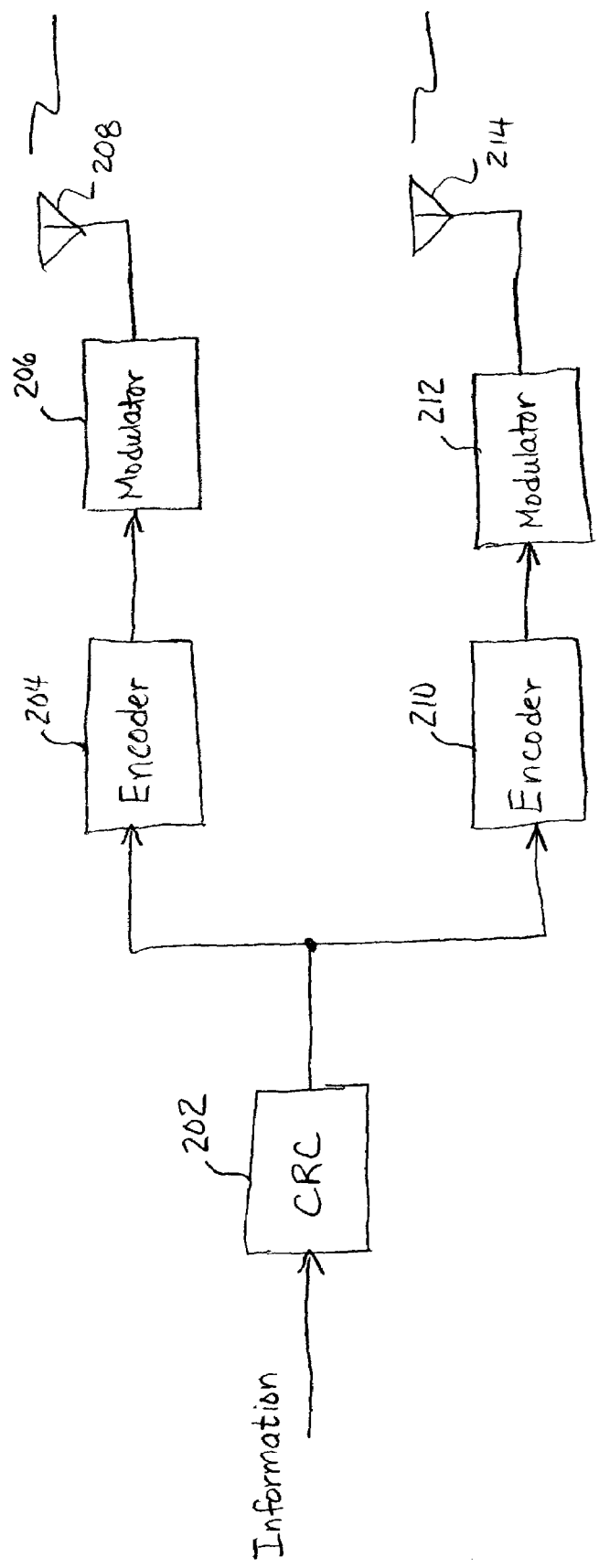
FIG. 2 depicts another version of the system architecture for system transmit equipment shown in FIG. 1.

Referring to FIG. 1, there is shown a typical system transmit equipment architecture of a communication system wherein a portion of the information to be transmitted is transmitted by one antenna and another portion of the information is transmitted by the other antenna. Cyclic Redundancy Check (CRC) error coding is applied to information to be transmitted. CRC coding, performed by CRC coder 102, is a well known error detection scheme in which error detection bits are added to the information to allow receive equipment to determine whether the information, when received, contains errors. The output of CRC coder 102 is applied to encoder 104 which applies channel coding operations on the error coded information. Channel coding comprises various well known channel coding operations in which bits are added to a block of information to add redundancy to the information thereby making the coded block more robust and less vulnerable to channel anomalies that cause errors to occur. A portion of the channel coded information and error correction coded information is applied to modulator 106 and transmitted by antenna element 110. Another portion of the information is applied to modulator 108 and transmitted by antenna element 112. The apportionment of the information to be transmitted can be performed at any point along the CRC, encoder, modulator and antenna system architecture. Also, the apportionment can occur prior to the traffic information being applied to the CRC coder. In FIG. 2, a transmit system equipment architecture similar to that shown in FIG. 1 is shown except that the apportionment of the information to be transmitted is done at the Encoder. Unlike FIG. 1, in FIG. 2 there are two channel encoders (204, 210) connected to modulators 206 and 212 respectively. The modulators are connected to antenna elements 208 and 214 respectively. CRC coder 202, which is connected to the input of both channel encoders (204, 210), applies the proper CRC coding to the information that is to be transmitted.

When portions of the traffic information are transmitted by different antennas, all of the transmitted portions are to be received without errors; otherwise the original block of traffic information cannot be decoded. Therefore, when at least one of the portions is received with errors, the entire block of traffic information has to be retransmitted. Suppose the traffic information is divided into two portions (a first portion and a second portion) and one of the portions is received with errors. Because the decoding is performed on the entire block of traffic information it is not possible to determine which of the channels and corresponding antenna transmitted the erroneous portion. It may be that one of the antennas and its corresponding channel is causing the errors. The method of the present invention allows the traffic information to be retransmitted using different antennas by adding a "swapping" signaling information to the format of the SPDCCH. Swapping signaling information is information that indicate which system equipment is to be used to transmit the forward link traffic information. Depending on the size of the MIMO antenna system, the swapping information (e.g., swapping bits) can have any integer value equal to 2 or greater. In particular, still referring to FIG. 2, if a first portion of the traffic information was transmitted by antenna 208 and the second portion of the traffic information is transmitted by antenna 214 and a portion of the transmitted traffic information was received with errors, the traffic information can be retransmitted whereby the second portion is now transmitted by antenna element 208 and the first portion is transmitted by antenna element 214. Alternatively, both portions can be retransmitted by either antenna element 208 or antenna element 214. Further, the traffic information can be retransmitted using the same antennas for the same portions. The value of the swapping bit information determines which antenna elements transmit which portions of the traffic information. The swapping information thus allows the communication system to select which antenna element is to retransmit traffic information.

Because relatively larger amounts of information are conveyed over the RACKCH and the RCQICH reverse link signaling channels, the method of the present invention provides three basic mechanisms to convey these signaling information. In the reverse link, when there are different signaling information associated with the same or different user equipment, a Time Division Multiplex (TDM) technique can be used to transmit these signaling information from user equipment to system equipment. The service provider will assign particular time slots to particular user equipment to allow each such user equipment to transmit signaling information over the reverse link at their designated time slots. In the CDMA communication system being discussed the time slots are 1.25 msec in duration.

A second mechanism provided by the method of the present invention for the reverse link signaling channels is the addition of communication channels. For example, in a CDMA system using 64-ary Walsh codes (i.e., 6-bit Walsh codes), the system is modified to have 128-ary (i.e., 7-bit) Walsh codes. Walsh codes are a set of N-bit codes (each of which is unique within the set) that do not interfere with each other even when transmitted simultaneously with attached signaling and/or traffic information; N is an integer equal to 2 or greater. Thus, each Walsh code is akin to a separate and independent communication channel.

The third mechanism provided by the method of the present invention is to allow the reverse link information to be transmitted at relatively higher order modulation. The modulation order refers to the amount of information represented by a transmitted symbol. In current CDMA systems, the reverse link information is transmitted using BPSK (Binary Phase Shift Keying) where a transmitted symbol represents one bit of information. In the method of the present invention, the reverse link signaling information is transmitted using QPSK (Quadrature Phase Shift Keying) where a transmitted symbol represents two bits of information. In transmitting the reverse link signaling information in accordance with the method of the present invention any one of the above three mechanisms can be used and, more importantly, any combination of the above described three mechanism can be used. The Signal to Interference Noise Ratio (SINR) of signals conveyed over forward traffic channels are transmitted by users to system equipment over the RCQICH. The system defines a threshold power level and the user equipment measure the power levels of the signals transmitted over the traffic channels. The measured power levels and the defined threshold power levels are used by the user equipment to calculate the SINR for a particular traffic channel.

Figure 3:
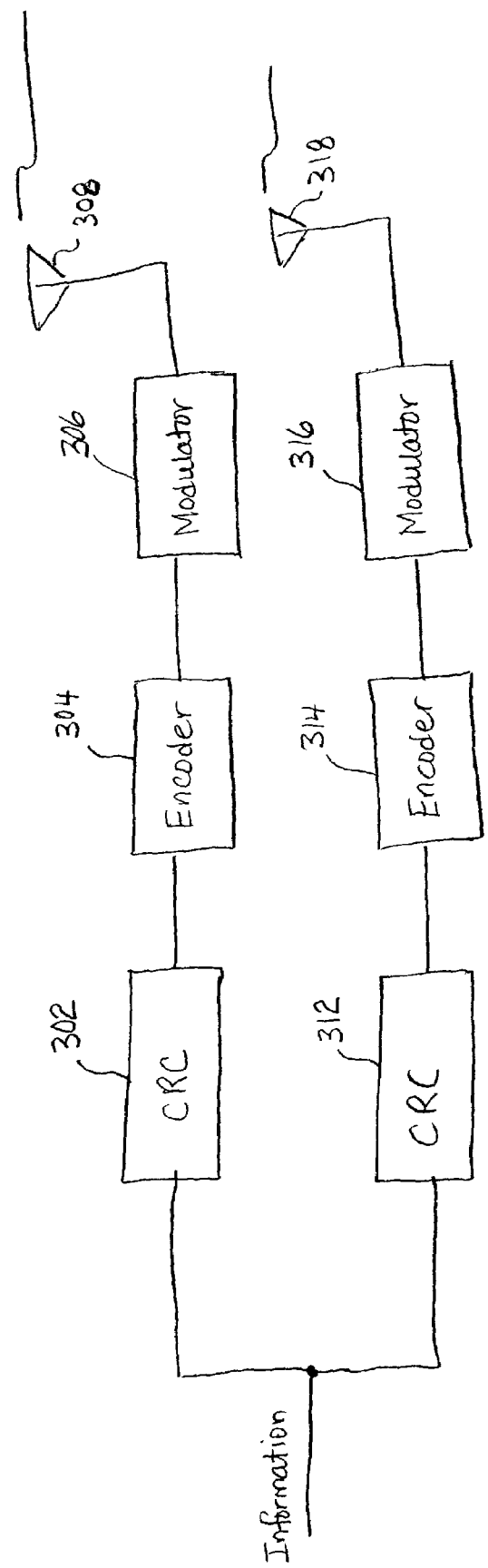
FIG. 3 depicts an architecture for system transmit equipment using a 2×2 MIMO antenna system with separate error correction coding that applies the method of the present invention.

Referring now to FIG. 3 there is shown a typical transmit system equipment architecture where information to be transmitted are CRC coded by different CRC coders (302, 312). Similarly the channel encoders (304, 314), modulators (306, 316) and antenna elements (308, 318) are separate distinct system transmit equipment. When one or more blocks of information are transmitted simultaneously some blocks are transmitted using one branch and the other blocks are transmitted using the other branch. If only one block is being transmitted, it is transmitted using one of the branches and the other branch is left unused. For clarity, with respect to FIG. 3, the term "branch" refers to one set of transmit equipment such as CRC 302, Encoder 304, Modulator 306 and antenna 308 (hereinafter "the first branch"). Another set of transmit equipment, i.e., another "branch," is represented by CRC 312, Encoder 314, Modulator 316 and antenna 318 (hereinafter "the second branch"). Say, for example, two blocks of information are being transmitted. A first block of information is transmitted using the first branch while at the same time a second block of information is transmitted using the second branch. Because of the particular architecture of FIG. 3, each block of information has a different CRC. That is, the first block is coded by CRC 302 while the second block is coded by CRC 312. Because the blocks have different CRCs, there is greater flexibility afforded the transmit equipment because it does not have to retransmit both blocks of information in the case one of the blocks was received with errors; the equipment can retransmit only the block that was received with errors. Alternatively, the transmit equipment can retransmit the block by itself or retransmit the block simultaneously with a new block of information. This flexibility allows a service provider to increase a system's throughput because it does not have to retransmit information that has already been received correctly (i.e., without errors).

To further allow a service provider the ability to convey greater amounts of information, portions of the set of communication channels (signaling and traffic channels) of the communication system are assigned to specific users. Thus, certain users will have certain forward and reverse link signaling channels associated with them. The system equipment will indicate the particular communication channels assigned to particular users with channel assignment information included in the forward link signaling channel (e.g., SPDCCH); that is, channel assignment information is signaling information that indicates which particular channels of a communication system are assigned to which users. More than one channel can be assigned to a particular user. Signaling information containing assigned set of communication channels are broadcast to intended users, but such signaling information are received and decoded by unintended users so that the users can determine their assigned portions of the available communication channels.

Referring to FIG. 4, Walsh code space 400 of available set of codes is shown. Suppose the code space is being apportioned between three users where each portion is delineated by boundaries. In the example shown user 1 is assigned the set of codes bounded by $T_1$, user 2 is bounded by $T_1$ and $T_2$ and user 3 is bounded by $T_2$ and $T_3$. Information transmitted by system equipment over an SPDCCH contains the boundary information (i.e., a type of channel assignment information) indicating that $T_1$ is the boundary for user 1. This information is broadcast by the transmit equipment and is thus not only received and decoded by user 1, but is also received and decoded by users 2 and 3. Similarly signaling information over an SPDCCH intended for user 2 contains the boundary information $T_2$ and signaling information transmitted over the SPDCCH intended for user 3 contains boundary information $T_3$. User 1 then is able to determine that all codes above boundary $T_1$ are available for use. User 2 is able to determine that all codes above boundary $T_2$ but below boundary $T_1$ are available for use. User 3 is able to determine that all codes above boundary $T_3$ but below boundary $T_2$ are available for use. Thus, each user is able to determine its portion of available codes from the reception and decoding of signaling information intended for that user and signaling information intended for other users. For example, user 2 was able to determine its available code portion from its received signaling information and signaling information intended for user 1. Similarly, user 3 uses its own received signaling boundary information and signaling boundary information intended for user 2 to determine its available code portion. Therefore, in general, a user equipment is able to determine its set of available channels from signaling information it receives and from signaling information intended for other user equipment. Thus the channel assignment information is called signaling boundary information for CDMA systems because such systems, as explained earlier, represent their channels with Walsh codes.

It will be understood that the method of the present invention is applicable to other types of wireless communication systems and is not limited to the CDMA communication system discussed above. Further, the method of the present invention is also applicable to wireline communication systems.

We claim:

1. A method of communication comprising:
communicating information over a forward link signaling channel comprising a forward link signaling channel format having antenna select information for retransmitting traffic information using at least one of a plurality of antenna elements, wherein the antenna select information indicates retransmitting at least a portion of the traffic information using one of the antenna elements different from another one of the antenna elements used for a previous transmission of the portion of the traffic information.

2. The method of claim 1 comprising providing additional communication channels that are assigned to particular users of a communication system using channel assignment information in the antenna select information.

3. The method of claim 1 comprising providing additional communication channels assigned to particular users of a Code Division Multiple Access communication system by using additional Walsh codes.

4. The method of claim 1 where different portions of the traffic information is transmitted by different antenna elements of a Multiple Input Multiple Output antenna system based on the antenna select information.

5. The method of claim 1 where a Code Division Multiple Access communication system is used for communication and the forward link signaling channel is a secondary packet data control channel that includes swapping bits for indicating which antenna is to transmit or retransmit the traffic information and boundary information for assigning particular channels to particular users.

6. The method of claim 1, comprising:
transmitting a first portion of the traffic information using a first one of the antenna elements;
transmitting a second portion of the traffic information using a second one of the antenna elements; and
retransmitting the second portion of the traffic information using the first one of the antenna elements if the second portion of the traffic information was received in error responsive to the antenna select information.

7. The method of claim 6, comprising:
retransmitting the first portion of the traffic information from the first one of the antenna elements with the retransmitted second portion of the traffic information responsive to the antenna select information.

8. The method of claim 6, comprising:
retransmitting the first portion of the traffic information from the second one of the antenna elements responsive to the antenna select information.

9. The method of claim 1, comprising transmitting over the forward link signaling channel.

10. The method of claim 1, comprising receiving over the forward link signaling channel.

11. The method of claim 1, wherein the antenna select information indicates retransmitting at least one other portion of the traffic information using one of the antenna elements that was also used for a previous transmission of the at least one other portion of the traffic information.

* * * * *